United States Patent
Lombardo et al.

(10) Patent No.: US 8,807,901 B1
(45) Date of Patent: Aug. 19, 2014

(54) UNIVERSAL HAMMERLESS PIN ASSEMBLY

(71) Applicants: Pasquale Lombardo, Pheonix, AZ (US); Gaetano Lombardo, Phoenix, AZ (US)

(72) Inventors: Pasquale Lombardo, Pheonix, AZ (US); Gaetano Lombardo, Phoenix, AZ (US)

(*) Notice: Subject to any disclaimer, the term of this patent is extended or adjusted under 35 U.S.C. 154(b) by 0 days.

(21) Appl. No.: 14/051,273

(22) Filed: Oct. 10, 2013

(51) Int. Cl.
F16B 37/14 (2006.01)
F16B 19/00 (2006.01)

(52) U.S. Cl.
CPC .................. *F16B 19/008* (2013.01)
USPC .......... 411/372.6; 411/347; 411/351

(58) Field of Classification Search
USPC ......... 411/347, 351, 371.1, 372.5, 372.6, 373
See application file for complete search history.

(56) References Cited

U.S. PATENT DOCUMENTS

| | | | |
|---|---|---|---|
| 2,487,084 A | 11/1949 | Weiss | |
| 2,627,423 A | 2/1953 | Copeman | |
| 2,629,281 A | 2/1953 | Baselt | |
| 3,807,766 A | 4/1974 | Pleier et al. | |
| 3,979,994 A | 9/1976 | Collignon | |
| 4,576,021 A | 3/1986 | Holden | |
| 5,879,117 A * | 3/1999 | Chen et al. | 411/373 |
| 6,055,832 A * | 5/2000 | Wyers | 70/34 |
| 6,537,006 B1 * | 3/2003 | Clark | 411/82 |
| 6,672,115 B2 * | 1/2004 | Wyers | 70/14 |
| 6,679,712 B2 * | 1/2004 | Chang | 439/248 |
| 8,444,354 B2 | 5/2013 | Nielsen | |
| 8,495,826 B2 * | 7/2013 | Itou et al. | 37/456 |
| 2003/0206786 A1 * | 11/2003 | Smith | 411/347 |
| 2009/0165339 A1 * | 7/2009 | Watanabe | 37/454 |

* cited by examiner

*Primary Examiner* — Roberta Delisle
(74) *Attorney, Agent, or Firm* — Thomas W. Galvani, P.C.; Thomas W. Galvani (57) ABSTRACT

A universal hammerless pin assembly for internally coupling pieces of heavy machinery includes a pin having a cylindrical shank, a head, and a shoulder disposed therebetween along an axis. A cap is moveable between a free condition off the pin and an assembled condition on the head of the pin. In the assembled condition of the cap, a washer is carried on both the pin and the cap. In the assembled condition of the cap, the cap moves between an uncompressed condition and a compressed condition binding the washer on both the pin and the cap. The washer defines an interference coupling the pieces of heavy machinery and preventing relative movement of the pieces.

14 Claims, 5 Drawing Sheets

UNIVERSAL HAMMERLESS PIN ASSEMBLY

FIELD OF THE INVENTION

The present invention relates generally to heavy machinery equipment, and more particularly to fasteners for coupling heavy machinery parts.

BACKGROUND OF THE INVENTION

Heavy machinery equipment is used in mining, excavation, demolition, construction, and similar activities. The parts of heavy machines which are used for digging are exposed to a great amount of wear in operation. For instance, a ground engaging tool has teeth which continually dig, rip, cut, or lift dirt, rock, concrete, metal, or other rugged materials, which constantly wear against and abrade the surface of the teeth.

Heavy machinery parts are expensive and time-consuming to repair or replace, so many pieces of equipment are applied with wear plates or wear structures which can be replaced more quickly. For instance, on a ripper, the tooth may be a durable cover fitted onto the end of the ripper shank, so that when the tooth wears out, the tooth is removed and replaced without the need to repair the entire ripper shank. By removing and replacing only those parts which directly engage with the ground, considerable time and expense can be saved.

However, there are many safety issues with current designs of replacement parts. Current designs require that a sledgehammer be used to install pins which secure the replacement parts on the ripper shank. The pins are hammered into the parts, and often a tool is placed against the pin and hammered with the sledgehammer. This can lead to serious injury when the tool moves, is broken, or the sledgehammer misses its mark. The safety organizations which regulate workplace safety, such as MSHA and OSHA, disapprove of pins and replacement parts which require sledgehammers for installation. Further, a sledgehammer is also frequently used to remove the pin, by hammering the pin out of the replacement part and the ripper shank. Again, this often leads to serious injury.

Many manufacturers of such replacement parts also incorporate unique or proprietary features in the parts that make removal and replacement difficult and expensive. Some manufacturers build replacement parts with special slots that will only accommodate their own tools. Others build parts that will only accept their own replacement parts. For instance, on a ripper shank, the end of the ripper shank may be specially formed to only accept a tooth from the same manufacturer that made the ripper nose. Similarly, the tooth may have a slot or other engagement feature that requires that a proprietary pin be used to couple the tooth to the end of the ripper shank, because a slot formed between the ripper shank and the tooth will only accept those pins. Still further, some manufacturers may create coupling pins that require uniquely-shaped keys or tools to install or remove the pins.

Ripper shanks are generally made from monolithic, or one-piece steel plates which are available in a variety of sizes and shapes up to about 170 inches. Because of the risk of injury involved in removal of a replacement part from a ripper shank with a sledgehammer, many organizations will use a cutting torch to remove the replacement part. An adapter must then be welded on to the ripper shank at a later time for future use with other replacement parts. This torch cutting and welding not only takes quite a lot of time and money, but creates a weak spot on the ripper shank which is predisposed to failure during use.

Further, not only do such proprietary replacement parts prove to be expensive and difficult to replace because of the manufacturer's design choices, but the replacement of some is hampered when worn or damaged severely. For example, if dirt builds up in the space between the tooth and end of the ripper, the tooth can bind to the ripper and be very difficult to remove, requiring crowbars and sledgehammers to remove. If dirt clogs the socket or keyway which receives the key or tool, removal can also be difficult. An improved fastening device for coupling heavy equipment parts is needed which can be used regardless of special or proprietary engagement features in the heavy equipment.

SUMMARY OF THE INVENTION

According to the principle of the invention, a universal hammerless pin assembly for internally coupling pieces of heavy machinery includes a pin and a cap for application to the pin. The pin has a cylindrical shank, a reduced-diameter head, and a shoulder disposed therebetween. The cap has a cylindrical sidewall and a reduced-diameter collar projecting from the sidewall. Application of the cap on the head defines an inset circumferential channel formed by the shoulder of the pin and by the collar of the cap. A washer is applicable to the channel and has an inner diameter sized to encircle the channel. When the washer is seated in the channel, the washer is prevented from axial movement out of the channel by the shank of the pin and the sidewall of the cap, thus defining an interference for engagement within the pieces of heavy machinery to couple the pieces.

BRIEF DESCRIPTION OF THE DRAWINGS

Referring to the drawings.

DETAILED DESCRIPTION

Figure 1:
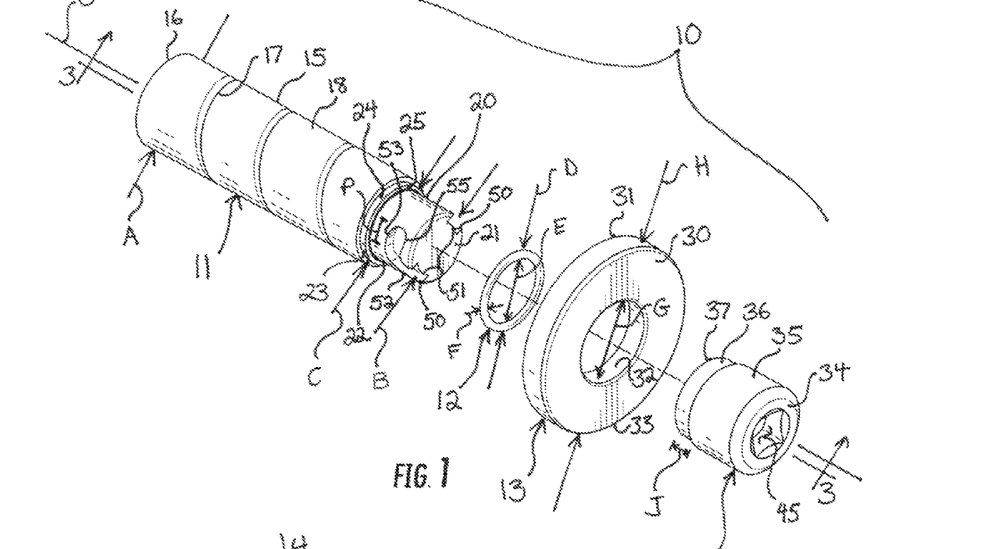
FIG. 1 is an exploded perspective view of a universal hammerless pin assembly constructed and arranged according to the principle of the invention, including a pin, an O-ring, a washer, and a cap.

Reference now is made to the drawings, in which the same reference characters are used throughout the different figures to designate the same elements. FIG. 1 illustrates an exploded view of a universal hammerless pin assembly 10 constructed and arranged in accordance with the principle of the invention. The pin assembly 10 includes a pin 11, an O-ring 12, a washer 13, and a cap 14. The pin assembly 10 is useful for internally coupling pieces of heavy machinery together at a hole or pivot joint, and is useful for doing so without the need for special or proprietary tools and without engaging with special or proprietary features in the heavy machinery. The pin assembly 10 couples pieces of heavy machinery by engaging securely with itself, rather than with interfaces, slots, sockets, or other features in the heavy machinery, to form an engagement between the heavy machinery which will not release accidentally and which will not bind, corrode, or deteriorate with use.

Figure 2A:
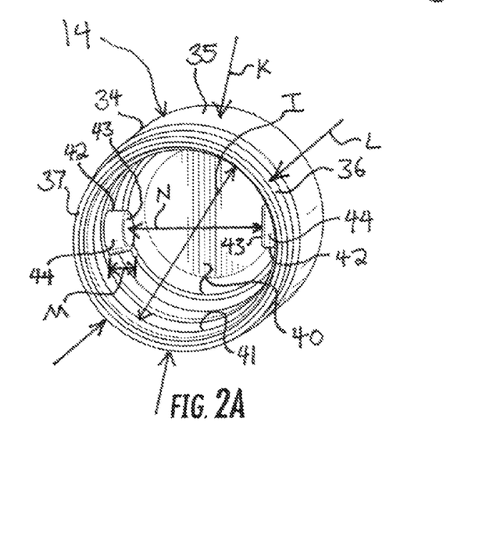
FIG. 2A is a perspective view of the cap of FIG. 1.
Figure 2B:
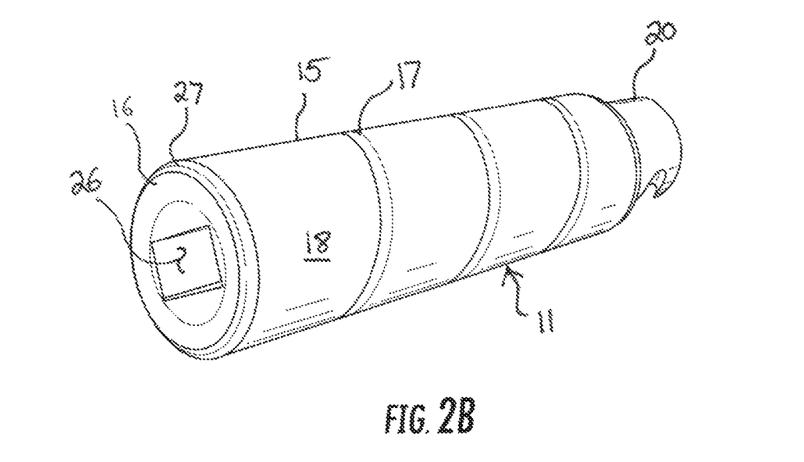
FIG. 2B is a perspective view of the pin of FIG. 1.

The pin 10 is an elongate member including a cylindrical shank 15 extending from an end 16 to a head 20. The shank 15 has a diameter A which tapers from the end 16 to the head 20, so that the diameter A is largest proximate to the end 16 and smallest proximate to the head 20. A single helical groove 17 extends into a sidewall 18 of the shank 15, encircling the shank 15 and extending in a clockwise direction proximate to the head 20 to the end 16. As seen in FIG. 2B, which shows the pin 15 alone in isolation from a rear view, the end 16 of the pin 11 has a square hole 26 formed into the shank 15 to accept a square-headed wrench or bolt for turning or rotating the pin 11. A chamfer 27 is defined between the end 16 and the sidewall 18 of the shank 15 and extends continuously about the sidewall 18 at the end 16.

Returning to FIG. 1, the head 20 is integrally formed to the shank 15 and has a diameter B which is less than the diameter A of the shank 15 proximate to the head 20. The head 20 has a flat top 21 and an annular sidewall 22. A shoulder 23 is formed between the shank 15 and the head 20, stepping the diameter of the pin 11 down from the shank 15 to the head 20. The shoulder 23 is an upstanding, coaxial annular projection on the head 20 proximate to the shank 15, and has a cylindrical sidewall 24 with an annular top surface 25 and a diameter C that tapers slightly from proximate the shank 15 to proximate the head 20. The shank 15, head 20, and shoulder 23 preferably are constructed monolithically from a material having strong, rigid, hard, and durable material characteristics.

The O-ring 12 is an elastic rubberized ring have elastomeric qualities of durability, elasticity, resiliency, tackiness, and shape memory. Further, the O-ring 12 is constructed from a material having resistance to high temperatures, so that the O-ring 12 does not degrade when exposed to high temperatures caused by the impact and interaction of the heavy machinery with the earth. The O-ring has an outer diameter D, an inner diameter E, and a thickness F.

Figure 2C:
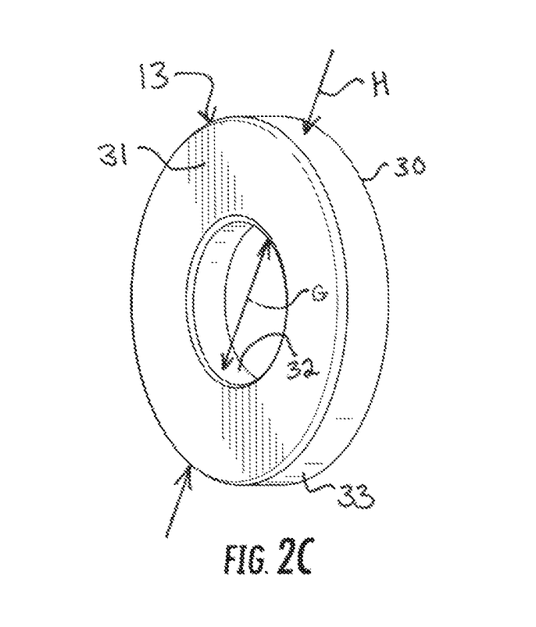
FIG. 2C is a perspective view of the washer of FIG. 1.

The washer 13 is a solid annular ring with a front face 30 an opposed rear face 31 (shown in FIG. 2C), an inner sidewall 32, and an outer sidewall 33. It should be noted that "front" and "rear" are used only to identify and distinguish the front and rear faces 30 and 31 with common and easily understood modifiers, and not to indicate directionality of the pin assembly 10 or for any other such reason. An inner diameter G extends within and is defined by the inner sidewall 32, and an outer diameter H extends to and is defined by the outer sidewall 33 of the washer 13.

The cap 14 has a closed end 34 and a cylindrical sidewall 35 extending therefrom to a reduced-diameter, cylindrical collar 36 which terminates in a circular open end 37 opposite the cap 14 from the closed end 34. The sidewall 35 and collar 36 are coaxial, thin-wall projections from the closed end 34 of the cap 14 and cooperate to define an interior 40, visible in FIG. 2A. The interior 40 is bound and defined by an interior face 41 of the cap 14 which has a constant inner diameter I. The cap 14 has two different outer diameters. The collar 36 is a reduced-diameter projection extending from the sidewall 35 a distance J; the sidewall 35 has an outer diameter K, and the collar 36 has an outer diameter L which is less than the diameter K. The diameter L of the collar 36 tapers slightly from proximate the sidewall 35 to the open end 37. The outer diameter K of the sidewall 35 is equal to the diameter A of the shank 15 proximate to the shoulder 23, and the outer diameter L of the collar 36 is equal to the diameter C of the shoulder 23.

Two lugs 42 carried on the interior face 41 project radially inwardly into the interior 40 from the sidewall 35. The lugs 42 are thus disposed forward to the collar 36, proximate to the closed end 34. The lugs 42 are diametrically opposed on the cap 14, and each has a face 43 and a sidewall 44. Each lug 42 is a truncated conical frustum, tapering slightly in diameter from proximate to the interior face 41 to the face 43 along a height M, as shown in FIG. 2A. The faces 43 of the lugs 42 are flat, circular, parallel to each other, and spaced apart by a distance N in FIG. 2A. The cap 14 has a square hole 45, shown in FIG. 1, formed into the closed end 34, to accept a square-headed wrench or bolt for turning or rotating the cap 14.

Figure 3A:
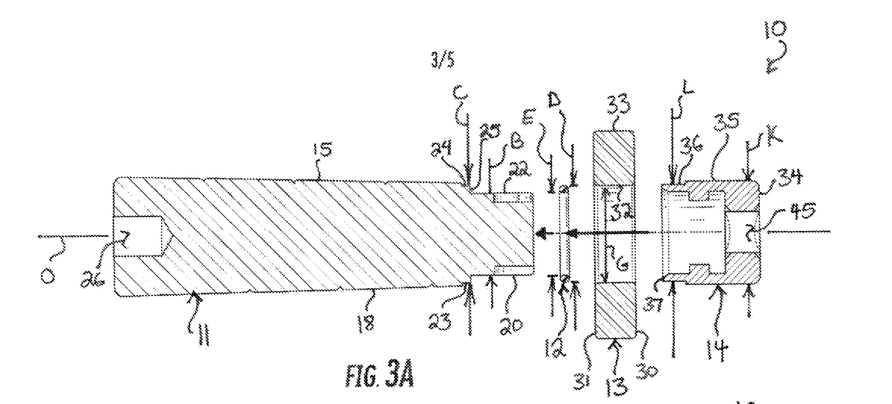
FIGS. 3A-3C are section views taken along the line 3-3 in FIG. 1 showing the steps of moving the universal hammerless pin assembly of FIG. 1 from a disassembled condition to an assembled condition.
Figure 3B:
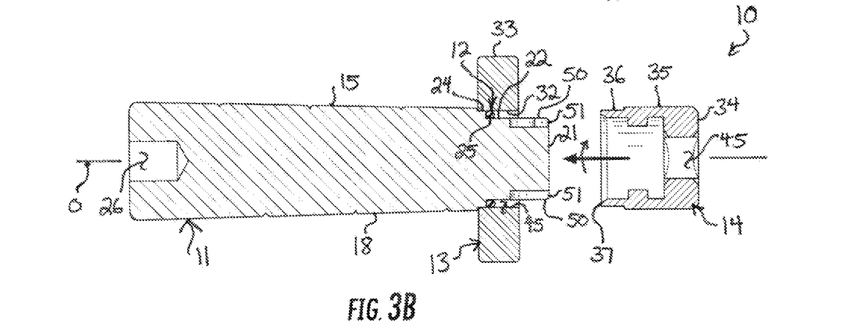
Figure 3C:
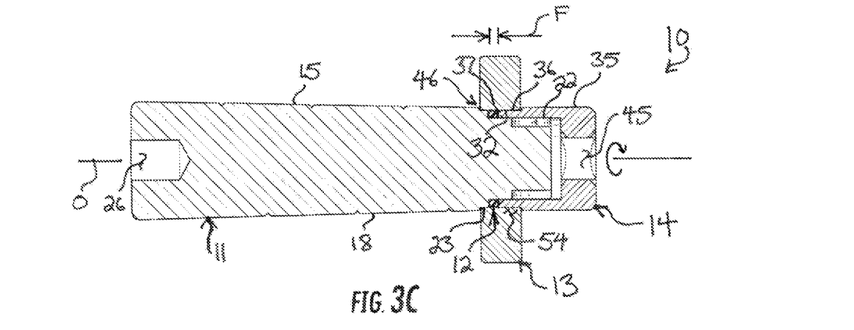

The pin assembly 10 is structured to be easily assembled and disassembled. As shown in FIG. 1 in exploded view, the pin 11, O-ring 12, washer 13, and cap 14 are coaxial along an axis O and are constructed to quickly fit onto each other. The pin assembly 10 moves between a disassembled condition, shown in FIG. 3A, and an assembled condition, shown in FIG. 3C, which further shows a compressed condition of the pin assembly 10. FIGS. 3A-3C show steps of moving the pin assembly 10 from the disassembled condition to the assembled and compressed condition, as would be undergone when using the pin assembly 10 for internally coupling pieces of heavy machinery.

Turning now to FIG. 3A, the pin assembly 10 is shown in a side sectional view taken along the line 3-3 in FIG. 1. The O-ring 12, washer 13, and cap 14 are all shown removed and free of the pin 11, aligned along axis O. The O-ring 12 is spaced in front of the pin 11, the washer 13 is spaced in front of the O-ring 12, and the cap 14 is spaced in front of the washer 13. To move the pin assembly 10 toward the assembled condition thereof, the O-ring 12 is first registered with the head 20 of the pin 11 and the shoulder 23. The inner diameter E of the O-ring 12 is passed over the head 20 and onto the pin 11 until the O-ring 12 is seated against the top surface 25 of the shoulder 23. The O-ring 12 closely encircles the sidewall 22 of the head 20. With the thickness F of the O-ring 12, the O-ring 12 is flush with the sidewall 24 of the shoulder 23, as clearly seen in FIG. 3B, so that the O-ring 12 projects radially just short of the sidewall 24.

Still referring to FIG. 3A, with the O-ring 12 seated against the shoulder 23, the washer is now registered with the head 20 of the pin 11 and the shoulder 23. The inner diameter G of the washer 13 is just larger than the diameter C of the shoulder tapered 23 at its largest diameter, and is just larger that the diameter L of the collar 36 of the cap 14. The washer 13 is passed over the head 20 until the inner diameter G is fit over the O-ring 12 and the sidewall 24 of the shoulder 23, as shown in FIG. 3B. As the washer 13 is passed over the shoulder 23, the tapered characteristic of the shoulder 23 causes the washer 13 to become centered coaxially on the shoulder 23. The washer 13 is thus seated axially against the shank 15 of the pin, radially encircles the sidewall 24 of the shoulder 23 in contact, and radially encircles the O-ring 12 in contact. In this way, the O-ring 12 is captured between the sidewall 22 of the head 20, the top surface 25 of the shoulder 23, and the inner sidewall 32 of the washer 13. Further, the O-ring 12, inner sidewall 32 of the washer 13, and the sidewall 22 of the head 20 cooperate to define a socket or annular channel 45 encircling the head 20 and ready to receive the cap 14, as shown in FIG. 3B.

Still referring to FIG. 3B, the cap 14 is registered with the head 20, and the collar 36 is registered with the annular channel 45 encircling the head 20. The cap 14 is advanced toward the head 20 as shown by the arrowed line in FIG. 3B, and the collar 36 is moved over the sidewall 22 of the head 20, in a close-fit arrangement providing no play in the radial direction. The collar 36 is received in the annular channel 45, and the tapered characteristic of the collar 36 causes the cap 14 to become centered coaxially with respect to the pin 11. As the collar 36 is received in the annular channel 45, the lugs 42 are introduced to two opposed grooves 50 formed in the head 20 of the pin 11. Referring back to FIG. 1, the grooves 50 are shown clearly. The grooves 50 are slots or channels formed into the sidewall 22 of the head 20, beginning at entrances 51 cut into the top face 21 and extending helically around the sidewall 22 in a clockwise orientation, when facing the top 21 of the pin 11. Each groove 50 is substantially elbow-shaped, and has an elongate top portion 52 generally aligned with the axis O and an elongate end portion 53 which is transverse to the axis O. Each elongate end portion 53 wraps around approximately one-quarter of the sidewall 22 of the head 20, and has a length P transverse to the axis O. The elongate end portions 53 terminate in enlarged heads 55 which are forwardly-directed recesses in the head 20. The enlarged heads 55 extend just forward to, or distal to the end portions 53, such that the enlarged heads are receiving and locking spaces for the lugs 42. The length P of each elongate end portion 53 is greater than the width of each lug 42 on the cap 14. The grooves 50 each have a depth extending into the head 20 just greater than the height M of the lugs 42.

Referring back to FIGS. 3B and 3C, as the collar 36 is received in the annular channel 45, the lugs 42 are registered with the grooves 50. Each groove 50 is just wider than each of the lugs 42, and the lugs 42 slide into the grooves 50. As the cap 14 is further advanced over the head 20 and the collar 36 is further passed into the annular channel 45, the cap 14 is rotated slightly in a clockwise direction, as shown in FIG. 3B, so that the lugs 42 move into the top portions 52 of the grooves 50. When the lugs 42 are in the top portions 52 of the grooves 50, the collar 36 is fully received in the annular channel 45, and the open end 37 is seated against the O-ring 12, as shown in FIG. 3C. The collar 36 is disposed in contact between the sidewall 22 of the head 20 and the inner sidewall 32 of the washer 13. The pin assembly 10 is arranged in the assembled condition thereof, but is arranged in an uncompressed, or loose condition. In the assembled and uncompressed condition, the open end 37 is spaced apart from the top surface 25 of the shoulder 23 by a distance equal to the thickness F.

Also, in the assembled condition, the shoulder 23 of the pin 11, the O-ring 12, and the collar 36 of the cap 14 cooperate to define a circumferential channel 54 in the pin assembly 10, which extends slightly into the pin assembly 10 relative the sidewall 18 of the pin 11. For clarity, the term "circumferential" is used here to mean extending around the circumference of an object or structure. Thus, the channel 54 is an inset band in the pin assembly 10. The channel 54 has a diameter equal to the diameters C, G, and L of the shoulder 23, washer 13, and the collar 36, respectively, and just less than the diameters A and K of the shank and sidewall 35 of the cap 14, respectively. The washer 13 is received within the channel 54, and sides of the channel 54, formed by the sidewall 18 of the pin 11 proximate to the shoulder 23 and the sidewall 35 of the cap 14 proximate to the collar 36, prevent the washer 13 from moving axially out of the channel 54, but allowing the washer 13 to play slightly. The shoulder 23 of the pin 11, the O-ring 12, and the collar 36 of the cap 14, when brought proximate to each other in the assembled condition by application of the cap 14 on the pin 11, form this engagement assembly, generally denoted with reference character 46, which lock the washer 13, preventing the axial movement of the washer 13 with respect to the pin 11 and the cap 14 beyond mere loose play in the engagement.

To move the pin assembly 10 into the compressed condition in which the pin assembly 10 is tightened, the cap 14 is rotated clockwise as shown by the arrowed line in FIG. 3C. Rotating the cap 14 clockwise with respect to the pin 11 causes the lugs 42 to move from the top portions 52 of the grooves 50 to the elongate end portions 53. As the lugs 42 move into the end portions 53, the cap 14 rotates and moves slightly further onto the head 20, compressing the O-ring 12 axially between the shoulder 23, the washer 13, and the open end 37 of the cap 14. Further rotation of the cap 14 causes the lugs 42 to then move into the enlarged heads 55 at the ends of the elongate end portions 53, and O-ring 12 causes the cap 14 to move forward slightly. In the assembled and compressed condition, the open end 37 is spaced apart from the top surface 25 of the shoulder 23 by a distance less than the thickness F of the O-ring 12. Axial compression of the O-ring 12 imparts radial expansion, or bulging, of the O-ring 12, so that the O-ring 12 deforms radially between the inner sidewall 32 of the washer 13 and the sidewall 22 of the head 20. When compressed and bulging, the tacky and resilient material characteristics of the O-ring 12 prevent the washer 13 from rotating freely with respect to the pin 11 and prevent the washer 13 from moving axially on the pin 11, thus binding the washer 13 on the pin 11 to prevent free rotation. The washer 13 is still able to rotate, as is preferred to absorb impact when the heavy machinery is in use, but the washer 13 does not freely able to rotate.

Further, in response to the axial compression of the O-ring 12, the O-ring 12 produces an axial force, directed axially outwardly against the shoulder 23 of the pin 11 and against the collar 36 of the cap 14. The lugs 42 of the cap 14 are received in the enlarged heads 55 in the end portions 53 of the grooves 50, from which the lugs 42 may not be rotated relative to the axis O, so that the reactive axial force from the O-ring 12 causes the lugs 42 to contact and bind within the enlarged heads 55 of the grooves 50, thus preventing the cap 14 from moving directly off the head 20 of the pin 11 in the axial direction. Further, the tacky and resilient material characteristics of the O-ring 12 prevent the open end 37 of the cap 14 from rotating against and with respect to the O-ring 12 and the shoulder 23, further inhibiting rotational movement of the cap 14 with respect to the pin 11 and securing the cap 14 on the pin 11. Tightening of the cap 14 on the pin 11, such as by relative clockwise rotation of the cap 14 on the pin with the use of square-headed wrenches applied to the square holes 26 and 45 in the pin 11 and cap 14, respectively, firmly secures the cap 14 on the pin 11 as described above, such that the cap 14 will not inadvertently come loose. The engagement of the O-ring 12, the shoulder 23, the collar 36, and the washer 13 does allow the direct radial movement of the cap 14 off of the pin 11 when a sufficient rotational force is applied to the cap 14 and an axial force is applied into the cap 14 to compress the O-ring 12 and move the lugs 42 of the cap 14 out of the enlarged heads 55, such as may be produced by use of a lever arm applied to the cap 14, such as a square-headed wrench fit in the hole 45.

Figure 4:
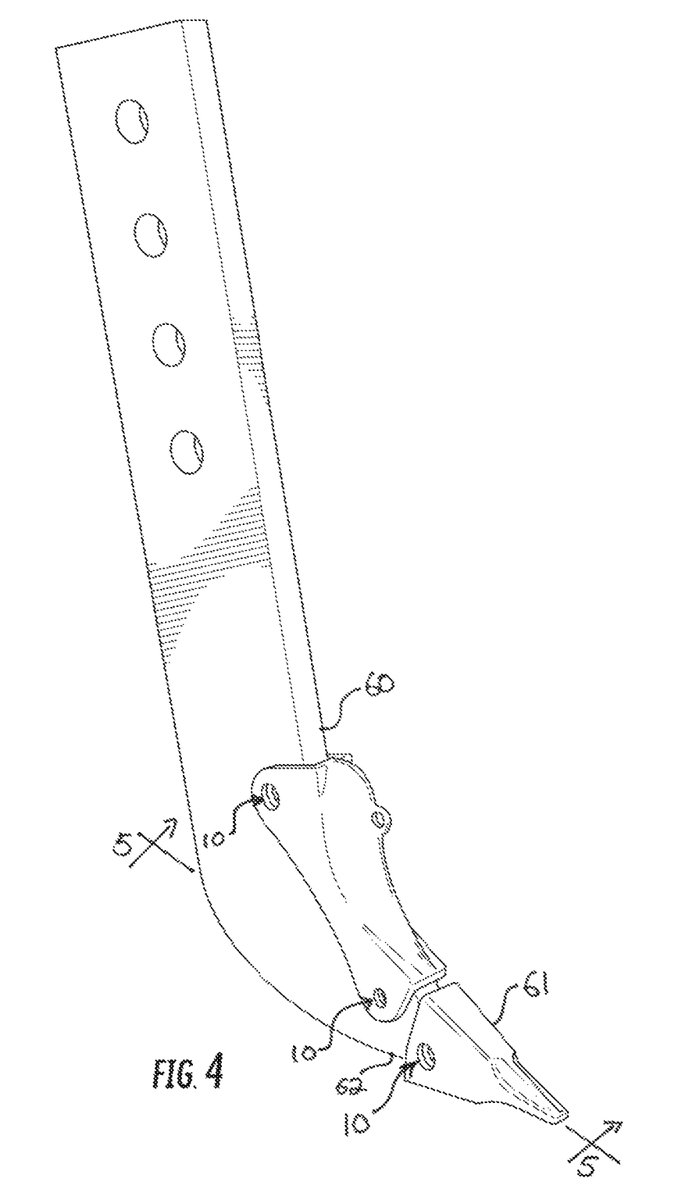
FIG. 4 is a perspective view of pieces of heavy machinery which the universal hammerless pin assembly of FIG. 1 is useful for coupling together.
Figure 5:
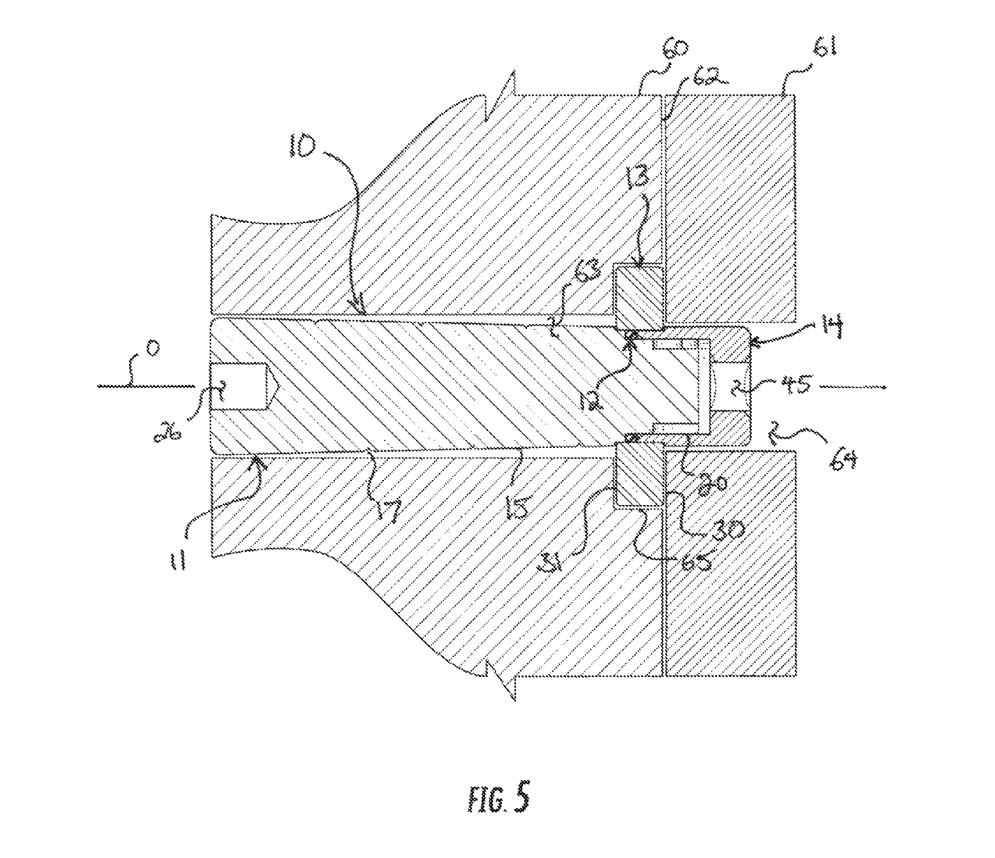
FIG. 5 is a sectional view taken along the line 5-5 in FIG. 4 showing the universal hammerless pin assembly of FIG. 1 applied to and coupling the heavy machinery of FIG. 4.

FIG. 4 and FIG. 5 show the pin assembly 10 in use with heavy machinery. FIG. 4 shows a ground engaging tool known as a ripper 60 or ripper shank fitted with a tooth 61. The ripper 60 is useful for tearing into the earth to loosen and excavate dirt and rocks. The tooth 61 is a protective cover fit over an end 62 of the ripper 60. The tooth 61 is removable and replaceable, so that as the tooth 61 is worn down with continued rugged use, it can be removed and then replaced with a new tooth. In this way, a small part of the ripper 60 can be replaced, avoiding maintenance costs and time necessary to repair larger portions of the ripper 60. FIG. 5 shows a section view through the ripper 61 taken along the line 5-5 in FIG. 4. The end 62 of the ripper 60 has a through hole 63 extending completely through the end 62, and the tooth 61 has a corresponding hole 64 through both sides of the tooth 61. When the tooth 61 is fitted onto the end 61 of the ripper 60, the holes 63 and 64 are aligned and can be securely joined at the holes 63 and 64.

With the universal hammerless pin assembly 10, the tooth 61 is coupled to the end 62 of the ripper 60 in a similar fashion as described above with respect to FIGS. 3A-3C. The end 62 of the ripper 60 has a depressed seat 65 to receive the washer 13, and the washer 13 is first placed into the seat 65, in alignment with the hole 63. The tooth 61 is moved over the end 62 of the ripper 60, and the pin 11 is inserted into the hole 63 in the end 62 of the ripper 60 and through the washer 13, with the O-ring 12 already applied to the pin 11. The cap 14 is then applied to the head 20 of the pin 11 in the assembled and uncompressed condition. Two square-headed wrenches are then applied to the pin assembly 10, one in each of the holes 26 and 45, and the cap 14 is rotated clockwise with respect to the pin 11, causing the lugs 42 to move into the end portions 53 of the grooves 50 and bind within the grooves 50, thus causing the cap 14 to bind on the head 20 of the pin 11 and the washer 13 to bind on the pin 11 and cap 14 in the compressed condition of the universal hammerless pin assembly 10.

Once bound in the compressed condition, the pin assembly 10 is within the tooth 61 and ripper 60, forming a strong fastener internally coupling the tooth 61 to the ripper 60 without engaging any interfaces, slots, sockets, or other features in the ripper 60. The tooth 61 is internally coupled to the ripper 60 because the coupling occurs entirely within the tooth and ripper 60 and without engagement to any interfaces, slots, sockets, or other features in the ripper 60. The washer 13 defines an interference between the ripper 60 and the tooth 61, coupling the tooth 61 on the ripper 60 and preventing relative movement of the ripper 60 and the tooth 61. The washer 13 is an interference between the ripper 60 and tooth 61 because the front face 30 of the washer 13 is received in interfering contact against the tooth 61, and the rear face 31 of the washer 13 is received in interfering contact against the ripper 60. The tooth 61 prevents axial movement of the washer 13, and thus also the pin assembly 10 in one direction, and the ripper 61 prevents axial movement of the washer 13, and thus also the pin assembly 10 in another direction. In this way, the washer 13 prevents axial movement of the pin assembly 10, and the tooth 61 cannot slide off of the ripper 60.

As the ripper 60 digs and excavates earth, dirt and debris will build up between the tooth 61 and the end 62 of the ripper 60. Specifically, dirt may fill or be compacted in the hole 64 in the tooth 61, covering the cap 14, or dirt may fill into the space encircling the shank 15 of the pin 11 in the hole 63 in the end 62 of the ripper 60. However, dirt covering the square hole 45 can easily be removed to provide access to the square hole 45, so that a square wrench may be applied to the cap. Further, the grooves 17 in the shank 15 of the pin 11 allow the pin 11 to be rotated slightly to break the pin 11 free from compacted dirt and debris so that the tapered shank 15. Excess or compacted dirt feeds slightly into the grooves 17 as the pin 11 is rotated, until the tapered diameter A of the shank 15 of the pin 11 is smaller than the compacted dirt in the hole 63, so that the pin 11 may be extracted from the end 62 of the ripper 60.

The present invention is described above with reference to a preferred embodiment. However, those skilled in the art will recognize that changes and modifications may be made in the described embodiment without departing from the nature and scope of the present invention. To the extent that such modifications and variations do not depart from the spirit of the invention, they are intended to be included within the scope thereof.

Having fully and clearly described the invention so as to enable one having skill in the art to understand and practice the same, the invention claimed is:

1. A universal hammerless pin assembly for internally coupling pieces of heavy machinery, the pin assembly comprising:
   a pin having a cylindrical shank, a reduced-diameter head, and a shoulder disposed therebetween;
   a cap having a cylindrical sidewall and a reduced-diameter collar projecting therefrom;
   application of the cap on the head defines an inset circumferential channel formed by the shoulder of the pin and the collar of the cap; and
   a washer seated in the channel, wherein the washer has an inner diameter sized to encircle and be received in the channel, and is prevented from axial movement out of the channel by the shank of the pin and the sidewall of the cap;
   wherein the washer defines an interference between the pieces of heavy machinery coupling the pieces and preventing relative movement of the pieces.

2. The universal hammerless pin assembly of claim 1, further comprising:
   a lug projecting inwardly inside the cap; and
   a groove formed in the head and sized to receive the lug on the cap for securing the cap on the head of the pin.

3. The universal hammerless pin assembly of claim 2, wherein:
   the groove includes an elongate top portion aligned with an axis of the pin;
   the groove includes an elongate end portion transverse to the axis of the pin which is longer than the lug on the cap; and
   the groove includes an enlarge head for receiving the lug.

4. The universal hammerless pin assembly of claim 1, further comprising an O-ring fit on the head of the pin proximate to the shoulder.

5. The universal hammerless pin assembly of claim 4, wherein the O-ring is in direct contact with each of the shoulder of the pin, the collar of the cap, and the washer.

6. A universal hammerless pin assembly for internally coupling pieces of heavy machinery, the pin assembly comprising:
   a pin having a shank, a head aligned along an axis, and a shoulder between the shank and the head which is smaller in diameter than the shank;
   a washer;
   a cap sized to fit onto the head of the pin, the cap having a projecting collar which has a reduced diameter;
   an engagement assembly formed by application of the cap on the pin, wherein the engagement assembly carries the washer on and between the pin and the cap and prevents axial movement of the washer with respect to the pin and the cap, so that the washer is an interference between the pieces of heavy machinery coupling the pieces and preventing relative movement of the pieces; and
   the engagement assembly includes a circumferential channel formed by the shoulder and the collar of the cap, respectively.

7. The universal hammerless pin assembly of claim 6, wherein the engagement assembly prevents axial movement of the cap with respect to the pin.

8. The universal hammerless pin assembly of claim 7, wherein the engagement assembly inhibits rotational movement of the cap with respect to the pin.

9. The universal hammerless pin assembly of claim 6, wherein:
   the shank of the pin has a diameter proximate to the shoulder which is greater than the shoulder;
   the cap has a diameter proximate to the collar which is greater than the collar; and
   the channel has a diameter which is less than the diameters of each of the shank and the cap, so that the channel is reduced in diameter with respect to the shank and the cap.

10. The universal hammerless pin assembly of claim 6, wherein the engagement assembly further includes an O-ring carried on the head of the pin and disposed between the shoulder of the pin and the collar of the cap.

11. The universal hammerless pin assembly of claim 10, wherein:
   the cap moves between an uncompressed condition on the pin and a compressed condition binding the cap on the pin;
   in the uncompressed condition, the O-ring is uncompressed; and
   in the compressed condition, the O-ring is compressed between the shoulder of the pin, the head of the pin, and the washer, and the O-ring exerts an axial force against the cap.

12. The universal hammerless pin assembly of claim 11, wherein:
   the O-ring has a thickness when uncompressed;
   in the uncompressed condition of the cap, the shoulder and cap are spaced apart by a distance equal to the thickness of the O-ring; and
   in the compressed condition of the cap, the shoulder and cap are spaced apart by a gap less than the thickness of the O-ring.

13. The universal hammerless pin assembly of claim 6, wherein the engagement assembly further comprises:
   grooves formed on the head of the pin; and
   inwardly-directed lugs formed on the cap corresponding to the grooves.

14. The universal hammerless pin assembly of claim 13, wherein the grooves are helical and have elongate end portions which are aligned transverse to the axis of the pin.

* * * * *